United States Patent
Angst

(10) Patent No.: US 11,872,742 B2
(45) Date of Patent: Jan. 16, 2024

(54) CONTAINER WITH GLOBE-LIKE PARTICLES AND AN INNER METAL LAYER AND METHOD FOR ITS FABRICATION

(71) Applicant: TITANX COATING TECHNOLOGIES GMBH, Zürich (CH)

(72) Inventor: Heinrich Angst, Zürich (CH)

(73) Assignee: TitanX Coating Technologies GmbH, Zürich (CH)

(*) Notice: Subject to any disclaimer, the term of this patent is extended or adjusted under 35 U.S.C. 154(b) by 0 days.

(21) Appl. No.: 17/917,638

(22) PCT Filed: Apr. 10, 2020

(86) PCT No.: PCT/EP2020/060351
§ 371 (c)(1),
(2) Date: Oct. 7, 2022

(87) PCT Pub. No.: WO2021/204404
PCT Pub. Date: Oct. 14, 2021

(65) Prior Publication Data
US 2023/0191683 A1 Jun. 22, 2023

(51) Int. Cl.
*B29C 49/22* (2006.01)
*B29C 48/00* (2019.01)
(Continued)

(52) U.S. Cl.
CPC ............ *B29C 49/22* (2013.01); *B29C 48/022* (2019.02); *B29C 48/32* (2019.02);
(Continued)

(58) Field of Classification Search
CPC ....... B29C 49/22; B29C 48/022; B29C 48/32; B29C 49/04116; B29C 49/0005;
(Continued)

(56) References Cited

U.S. PATENT DOCUMENTS

2002/0122883 A1  9/2002  Slat et al.
2014/0170410 A1  6/2014  Rupprecht et al.
(Continued)

FOREIGN PATENT DOCUMENTS

AU   2017 225 866    10/2018
CN      101288998    10/2008
(Continued)

OTHER PUBLICATIONS

Int'l Search Report (Form PCT/ISA/210) conducted in Int'l Appln. No. PCT/EP2020/060351 (dated Dec. 14, 2020).
(Continued)

*Primary Examiner* — Monica A Huson
(74) *Attorney, Agent, or Firm* — GREENBLUM & BERNSTEIN, P.L.C.

(57) ABSTRACT

A method to produce a container made of a plastic composition having an inner coating with a higher mechanical stability and/or a better adhesion to the container, includes preparing a plastic composition with at least one base polymer material and at least a first additive comprising globe-like particles having a hardness on the Mohs scale of at least 4, and extrusion blow molding of a container. The globe-like particles, which located on the inner surface of the container, increase the surface area and the hardness of the inner surface of the container. The method also includes applying the at least one metal layer of the inner coating onto the inner surface of the container, wherein the applied metal layer bonds to the globe-like particles of the first additive located on the inner surface of the container.

23 Claims, 2 Drawing Sheets

(51) Int. Cl.
    *B29C 48/32*     (2019.01)
    *B29C 49/04*     (2006.01)
    *B29C 49/00*     (2006.01)
    *B29C 49/42*     (2006.01)
    *B29C 70/64*     (2006.01)
    *B65D 23/02*     (2006.01)
    *B29K 23/00*     (2006.01)
    *B29K 483/00*     (2006.01)
    *B29K 501/00*     (2006.01)
    *B29K 505/00*     (2006.01)
    *B29K 509/02*     (2006.01)
    *B29L 31/00*     (2006.01)

(52) U.S. Cl.
    CPC .... *B29C 49/0005* (2013.01); *B29C 49/04116* (2022.05); *B29C 49/4273* (2013.01); *B29C 70/64* (2013.01); *B65D 23/02* (2013.01); *B29K 2023/06* (2013.01); *B29K 2023/12* (2013.01); *B29K 2483/00* (2013.01); *B29K 2501/00* (2013.01); *B29K 2505/00* (2013.01); *B29K 2509/02* (2013.01); *B29K 2995/007* (2013.01); *B29L 2031/712* (2013.01)

(58) Field of Classification Search
    CPC ..... B29C 49/4273; B29C 70/64; B29D 23/02; B29K 2023/06; B29K 2023/12; B29K 2483/00; B29K 2501/00; B29K 2505/00; B29K 2509/02; B29K 2995/007; B29L 2031/712
See application file for complete search history.

(56) References Cited

U.S. PATENT DOCUMENTS

| | | |
|---|---|---|
| 2016/0236820 A1 | 8/2016 | Paauwe et al. |
| 2017/0283118 A1 | 10/2017 | Paauwe et al. |
| 2020/0290768 A1 | 9/2020 | Paauwe et al. |

FOREIGN PATENT DOCUMENTS

| | | |
|---|---|---|
| CN | 103703159 | 4/2014 |
| CN | 109311272 | 2/2019 |
| EP | 0737562 | 10/1996 |
| JP | 62-130823 | 6/1987 |
| JP | H02-125717 | 5/1990 |
| JP | 2005-104496 | 4/2005 |
| JP | 2015-229496 | 12/2015 |
| JP | 2016-501143 | 1/2016 |
| JP | 2018171876 | 11/2018 |
| JP | 2019058923 | 4/2019 |
| JP | H09-048062 | 3/2021 |
| WO | 02/20246 | 3/2002 |
| WO | 2014/077681 | 5/2014 |
| WO | 2017/207367 | 12/2017 |

OTHER PUBLICATIONS

Int'l Written Opinion (Form PCT/ISA/237) conducted in Int'l Appln. No. PCT/EP2020/060351 (dated Dec. 14, 2020).
China Search Report/Office Action (SR/OA) conducted in counterpart China Appln. No. 202080101436.3 (dated May 18, 2023) (w/ translation).
Japan Decision to Grant (DtG)conducted in counetpart Japan Appln. No. 2022-562016 (dated Jun. 28, 2023) (w/ translation).

CONTAINER WITH GLOBE-LIKE PARTICLES AND AN INNER METAL LAYER AND METHOD FOR ITS FABRICATION

FIELD OF THE INVENTION

The invention relates to a method for producing a container made of a plastic composition having an inner coating on an inner surface of the container, the inner coating having a maximum thickness of 1000 nm and comprising at least one metal layer as well as to a container made of a plastic composition, wherein the plastic composition comprises a base polymer material and a first additive, wherein an inner coating comprising at least one metal layer is applied to the inner surface of the container, the inner coating having a maximum thickness of 1000 nm.

Containers within the meaning of the present inventions are hollow-bodied structures. Usually containers comprise a shell portion, which defines an inner volume or hollow of the hollow-body structure, as well as a base portion which closes the inner volume or hollow on one end of the hollow-bodied structure. Thus a container can either be used to store or hold goods of any kind or to house components or structures.

PRIOR ART

Containers made of a plastic composition with an inner coating comprising at least one metal layer can be used in a wide variety of technical fields, wherein the metal layer(s) can have different purposes. Even though inner coatings can have multiple layers of which one or more can be metallic layers, inner coatings with one to four, especially one to three, layers are preferred. Usually such inner coatings have a relatively small thickness of below 1000 nm, preferably below 500 nm, most preferred below 300 nm, compared to a total wall thickness of the container in order to either keep the amount of material used to produce the inner coating relatively low and/or not to negatively influence the flexibility of the container while simultaneously minimising the risk of breakage of the inner coating or the layers of the inner coating respectively.

Uncoated plastic containers can be manufactured with different processes, such as injection moulding, injection stretch blow moulding, blow moulding or pressure-die casting, wherein the processes themselves are known to those skilled in the art.

Metal layers of inner coatings can be formed from (technically pure) metals or alloys as well as from appropriate metal compounds, such as e.g. oxides, nitrides of one specific metal or of specific alloys.

One function of a metal layer of an inner coating can be seen in acting as a diffusion barrier, which prevents gases and/or liquids from diffusing from the inner volume to the outside of the container, which the plastic or polymer material of the plastic composition cannot prevent. Such a metal layer can in addition or alternatively prevent the diffusion from molecules of the plastic composition into the content of the container so that the content of the container, e.g. foodstuff or liquids, is not contaminated by impurities of the plastic composition, such as e.g. plasticisers. A metal layer can further be electrically conductive so that it can electromagnetically shield the inner volume.

In order to produce metal layers with the aforementioned properties the technique of physical vapour deposition is often used in containers.

One disadvantage of known containers made of a plastic composition with an inner coating comprising at least one metal layer can be seen in the fact that the inner coating is prone to be damaged by sharp objects, which could cause scratches in the inner coating, especially in the at least one metal layer. Such damages can lead to a failure of the above described positive effects of the metal layer. The problem intensifies, if the container shall retain its elastic properties and remain elastically squeezable without damaging the inner coating.

"Elastically squeezable" is a measure of the elastic flexibility of the container. It can be understood as meaning that the container is exposed to a squeezing force, which is essentially orientated perpendicular to a longitudinal axis of the container and pointing is inwards. Due to the restoring properties of the plastic composition a reset force pointing in the opposite direction resets the container to its original undeformed state once the squeezing force is released. Such a squeezing of the container can be for example necessary to improve the output of the container, e.g. if the content of the container is expected to be viscous or if a higher pressure is needed to allow the content to be poured out of the bottle. Such properties may be relevant for example for a bottle, preferably for a sports bottle. Furthermore such properties may be beneficial in order to prevent damages during transportation and/or if the container is dropped from a certain height.

Furthermore it has proven to be difficult with conventional means to achieve a desired high adhesion between the inner coating and the plastic composition of the container, especially with regard to retaining the elastic flexibility of the container.

OBJECT OF THE INVENTION

It is therefore an object of the invention to propose a container as well as a method for producing such a container which overcomes the disadvantages of the prior art and provides a higher mechanical stability of the inner coating, e.g. a better scratch resistance and/or resistance against abrasion, and/or a better adhesion between inner coating and the inner surface of the container. Furthermore, in case the container is configured as a squeezable container, the proposed method shall ensure the required mechanical stability of the inner coating. A further object of the invention can be seen in providing an improved method for producing containers with inner coatings at a higher economical rate.

DESCRIPTION OF THE INVENTION

In order to achieve the object set out above a method for producing a container made of a plastic composition having an inner coating on an inner surface of the container, the inner coating having a maximum thickness of 1000 nm and comprising at least one metal layer is provided, wherein following steps are carried out:
  preparing the plastic composition comprising at least one base polymer material and at least a first additive, wherein at least 2.5% by volume of a total volume of the plastic composition is made up by the first additive and wherein the first additive comprises globe-like particles having a hardness on the Mohs scale of at least 4;
  extrusion blow moulding of the (uncoated) container by
    a) heating and blending the prepared plastic composition until at least the base polymer material is plasticised;

b) forming a parison by means of a die and a blow pin, wherein the globe-like particles of the first additive are accumulated on an inner surface of the parison resulting from shear forces exercised by die and blow pin;

c) blow moulding of the parison to form the (uncoated) container, wherein globe-like particles of the first additive which located on the inner surface of the (uncoated) container increase the surface area and the hardness of the inner surface of the (uncoated) container;

applying the at least one metal layer onto the inner surface of the (uncoated) container, wherein the applied metal layer bonds to the globe-like particles of the first additive located on the inner surface of the (uncoated) container.

The method for producing the coated plastic container with an inner coating according to the invention relies on a synergistic combination of a first additive of the plastic composition and a favourable method of producing an uncoated container.

The first aspect of the invention relates to the addition of the first additive to the plastic composition. The first additive makes up at least 2.5% by volume of the plastic composition. It shall not remain unsaid that additives usually do not make up more than 40% to 50% by volume at the maximum of the total composition. Preferred ranges are between 5% and 30% by volume, more preferred between 10% and 20% per volume.

Due to the increased hardness of at least 4 according to the Mohs scale (approximately ~190 HV), preferably at least 6 according to the Mohs scale (approximately ~795 HV), the particles of the first additive can specifically increase the hardness of the inner surface of the container as discussed in more detail below.

Due to the geometrical shape of the particles of the first additive, namely because of the globe-like form, specific properties and behaviour of the particles can be achieved. It shall be understood that the term "globe-like" shall be understood as comprising sphere-shaped and ellipsoid-shaped contoured particles as well as convexly curved shaped contoured particles that in principle resemble such geometrical shapes and not only mathematically perfect spheres. The surface of the globe-like particles can be closed, porous, open porous or can have a high micro roughness. The globe-like particles may be configured as solid bodies and/or as hollow bodies, wherein hollow bodies have the advantage of a smaller density.

The globe-like particles of the first additive can for example be formed from plastic material or from inorganic materials, such as metals, metal compounds, intermetallic compounds, metal alloys, minerals, crystalline solids, composite materials, ceramics, glass or amorphous materials.

As the container is produced in a blow moulding process the plastic composition (including the first additive) is in a first step heated and essentially plasticised, as at least the base polymer material and preferably all or essentially all polymer materials of the plastic composition are plasticised before a parison is extruded. Because of the globe-like shape the particles of the first additive can be blended with the plasticised base polymer material without building agglomerations that would be detrimental for the forming process. Furthermore the globe-like shape of the particles improves the melt flow properties of the essentially plasticised composition (or at least does not adversely effect these properties) so that a melt flow index (MFI) of the essentially plasticised plastic composition within the die head can be achieved, which allows for a smooth formation of the parison. The heating and blending usually is carried out by an extruding device.

The parison is formed from the heated and blended plastic composition by conventional means, namely by using a die and a blow pin through which the required wall thickness and geometrical form of the parison is defined. As the globe-like particles of the first additive are non plasticised and retain their globe-like form during the extrusion and moulding process, a beneficial effect can be achieved during the formation of the parison: Due to the shear forces exercised on the essentially plasticised plastic composition by blow pin and die, the globe-like particles are "pushed" towards the inner surface of the parison so that the globe-like particles of the first additive are accumulated on and/or in an area adjacent to the inner surface of the parison, which will later form the inner surface of the uncoated container. It shall be understood in that context that globe like particles will still remain distributed in the polymer matrix of the whole parison/container, but due to the shear forces their concentration in the area of the inner surface is higher compared to an average concentration within the parison/container. Concentration in this relation can be understood as amount of particles per area (e.g. per $mm^2$) or as area covered by particles per total area (e.g. $\mu m^2$ per $mm^2$) which can be measured on a cross sectioned parison/container via a microspore or a suitable optical and/or computer based measuring means.

The effects described before may be improved, if the globe-like particles have low density compared to the surrounding plastic composition and or base polymer material.

The effects described before may further be improved if the globe-like particles have an intermetallic coating, preferably a silane (silicon-hydrogen) coating, which creates a tension between the globe-like particles and the surrounding plastic composition or base polymer material, preferably in the essentially plasticised state, which "pushes" the globe-like particles to the (inner) surface.

Subsequently the mould is closed and pressurised air is inserted into the parison in order to produce the final form of the container that is defined by the mould cavity. As the essentially plasticised plastic composition building the wall of the parison is stretched and thinned by the gas pressure, the globe-like particles that were accumulated in the area adjacent to the inner surface of the parison prevail to a large extent and thus are at least partially located on the inner surface of the uncoated container or in other words forming the inner surface at least in sections. This is because parts of the globe-like particles, usually in form of spherical-like caps, protrude out of the polymer matrix thus increasing the overall surface area of the inner surface compared to a uncoated container made of a conventional plastic composition without globe-like particles of the first additive.

Due to the higher hardness of the globe-like particles compared to the polymer matrix, also the hardness of the inner surface is increased.

In a further step one metal layer of the at least one metal layer of the inner coating is applied to the inner surface of the uncoated container, preferably by a sputtering process. The metal layer applied directly onto the inner surface of the (uncoated) container is called "the applied metal layer" for better readability.

The applied metal layer adheres to the different sections of the inner surface, namely the sections formed by the protruding globe-like particles of the first additive and to the sections formed by the polymer matrix, differently. While the adhesion between the polymer matrix and the applied metal layer can be compared to coated containers according to the known art, the adhesion between the globe-like particles and the applied metal layer is significantly increased due to the structure and/or material of the globe-like particles as well as due to the increased overall surface area. The effect of increased adhesion can be further enhanced, if the surface of the globe-like particles is porous, open porous or has a high micro roughness.

Due to the relatively high hardness of the globe-like particles also the scratch resistance and/or abrasion resistance of the applied metal layer, and if applicable subsequently applied layers of the inner coating, is increased as the bonding of globe-like particles and metal layer will not be affected by scratching or abrasion in the same way as a polymer-metal bonding (the polymer matrix is more resilient, which can lead to a separation of the polymer and the stiffer metal layer).

In a preferred embodiment the at least one metal layer is configured as one metal layer, two metal layers or three metal layers at maximum.

In a further preferred embodiment the inner coating consists of the at least one metal layer.

While the aforementioned method for producing a container with an inner coating is preferred due to the accumulation of globe-like particles on the inner surface, it shall not remain unmentioned that other manufacturing processes, such as die casting or multicomponent casting, may be used, that produce containers having similar advantageous effects. Thus in order to achieve the object set out above in a container made of a plastic composition, wherein the plastic composition comprises a base polymer material and a first additive, wherein an inner coating comprising at least one metal layer is applied to the inner surface of the container, the inner coating having a maximum thickness of 1000 nm, it is provided according to the invention that, the first additive comprises globe-like particles having a hardness on the Mohs scale of at least 4, wherein globe-like particles of the first additive which are located on the inner surface of the container increase the surface area and the hardness of the inner surface, wherein the inner coating, preferably the at least one metal layer, has an increased adhesion to the inner surface of the container due to an applied metal layer binding to the globe-like particles of the first additive located on the inner surface of the container.

As discussed before the globe-like particles have specific positive effects, especially those particles located near the inner surface of the container, preferably those particles forming at least sections of inner surface of the container, on the properties which shall not be repeated at whole. However, the globe-like shape of the particles has a further advantage with respect to flexible coated containers: due to the specific shape, the flexibility of the coated container is not negatively affected, even though the particles are distributed throughout the whole polymer matrix, so that the container can still be squeezed without the inner coating being damaged. This is because the shape of the globe-like particles allows the polymer matrix to be stressed without hindering its flexible properties significantly.

A preferred embodiment of the container according to the invention can, however, be achieved, if the container is obtainable by the afore-described method according the invention. Thus the beneficial effect of the accumulation of globe-like particles on the inner surface of the container can be achieved with an economically advantageous producing method.

In order to facilitate all positive effects described with regard to the method a further embodiment of the container according to the invention provides that the globe-like particles of the first additive are distributed in a polymer matrix of the container with respect to a cross-section area of the container in such way, that a ratio of globe-like particles per $mm^2$ is higher in an area adjacent the inner surface of the container that an average ratio of globe-like particles per $mm^2$ of the total cross-section area. This distribution of globe-like particles within the polymer matrix of the container ensures that the inner surface has an increased hardness and the surface area is increased due to the globe-like particles situated on the inner surface. It can be easily understood that concentrations or ratios of globe-like particles per $mm^2$ of the area covered by particles per $mm^2$ can be carried out on cross sections of containers with suitable means, wherein the sectional plane preferably incorporates a longitudinal and/or rotational axis of the container. The area adjacent to the inner surface is preferably defined as the area within a distance of 1 mm, preferably within 0.7 mm, more preferably within between 0.5 mm and 0.1 mm of the contour of the inner surface.

According to a preferred embodiment of the inventive method the globe-like particles of the first additive comprise silicon in an oxidised form and/or titanium in an oxidised form, wherein at least 50% by volume, preferably 75% by volume, of the first additive is made up by the globe-like particles. It has been proven that titanium and/or silicon based compounds, especially oxides thereof, are especially suitable for use as globe-like particles, as they can easily brought into the required shape and they further have the required hardness of at least 4 according to the Mohs scale. In order to ensure that the amount of globe-like particles within the first additive, which can additionally comprise fillers or binders or globe-like particles made of other materials, is sufficient to achieve the required technical effect, at least 50% by volume of the first additive is made up by the globe-like particles made of titanium or silicon in an oxidised form, preferably crystalline solid structures, such as titanium dioxide or silicates, e.g. aluminosilicates.

In another preferred embodiment of the method according the invention the globe-like particles of the first additive either substantially consist of a crystalline structure of which titanium in an oxidised form, preferably titanium dioxide, is the main component or silicon in an oxidised form, preferably silicon dioxide (silica), is the main component. It has been shown that crystalline structures such as titanium dioxide or silica (silicon dioxide) are especially suited to be used in the shape of microspheres in a method according to the invention. The expression "substantially consists of" shall be understood as covering all technically caused impurities. Further especially positive effects can be achieved, if the applied metal layer comprises titanium, preferably consists of technically pure titanium or of titanium compounds. "Main component" shall be understood as a structure that is essential for the formation of the, preferably ionic, crystal structure of which the globe-like particles are formed.

For similar reasons it is provided in an embodiment of the container according the invention that the globe-like particles of the first additive comprise silicon in an oxidised form and/or titanium in an oxidised form, preferably either substantially consist of a crystalline structure of which titanium in an oxidised form, preferably titanium dioxide, is a main component or silicon in an oxidised form, preferably silica (silicon dioxide), is a main component. It is preferred that the globe-like particles make up at least 5% by volume of the total volume of the plastic composition. Preferred ranges are between 5% and 30% by volume, more preferred between 10% and 20% per volume of the plastic composition.

A further preferred embodiment of the method and/or the container provides that the globe-like particles of the first additive are selected from a group consisting of cenospheres, aluminosilicate microspheres, intermetallic microspheres, phenolic microspheres, metal microspheres (such as e.g. microspheres made of copper, aluminium or silver), glass microspheres, ceramic microspheres, composite microspheres (such as e.g. polymer, glass or ceramic microspheres coated with metal or intermetallic structures), crystalline microspheres (such as e.g. microspheres with a titanium or silicon based crystalline structure), plastic microspheres (such as e.g. microspheres made of poly(methyl methacrylate) (PMMA)) or combinations thereof, which all provide for the required hardness and are suitable to be used as additives in order to form the container.

Best results for forming the parison, thus avoiding agglomerations in the plasticised plastic composition, and distributing the globe-like particles of the first additive throughout the polymer matrix can be achieved in further embodiments of the method according to the invention as well as of the container according to the invention, if the globe-like particles of the first additive have a diameter of between 0.5 µm and 50 µm. It shall not remain unmentioned that slight deviations of these diameters do not negatively affect the characteristics of the container, if the outliers only constitute a minority of the globe-like particles, e.g. less than 5%, preferably less than 1%. Furthermore it is preferred, if the globe-like particles are configured as microspheres.

In order to apply at least one metal layer of the inner coating, preferably the whole inner coating, on the inner surface of a container, a further embodiment of the inventive method provides that the at least one metal layer, preferably the whole inner coating, is applied onto the inner surface of the container by means of physical vapour deposition [PVD]. PVD methods, preferably sputtering methods, are well suited for applying thin metallic layers onto the inner surface of a container. In this regard PCT/EP2019/052662 shall be mentioned in which a container with a sputtered inner coating and a method for producing such a container are described in detail. Even though the cited application describes special containers and the thickness of the inner coating is varying, it can be easily understood that the method can also be used to deposit layers of uniform thickness on inner surfaces of arbitrary containers.

One drawback of PVD in a closed volume, such as within the inner volume of a container, is that the speed and wattage of the PVD process is limited as static electricity charges may lead to local spontaneous electrical discharges during the PVD process that lead to defects in the metal layer and/or the inner coating. Therefore in a further embodiment of the method according the invention it is provided that the plastic composition comprises a second additive having antistatic properties, wherein at least 0.5% by volume of the total volume of the plastic composition is made up by the second additive. The particles of the second additive having antistatic properties have a medium ($10^6$ to $10^{10}$ Ohms) to low resistance ($10^3$ to $10^5$ Ohms) and thereby enhance charge movement within the container. This can be achieved if the particles are configured as dissipative or conductive compounds. This leads to a better voltage distribution and prevents uncontrolled local discharges that could damage the inner coating or lead to process failures while applying the metal layer. In order not to negatively affect the inner coating the second additive should be non-migrating, i.e. remain in the dspolymer matrix as a permanently conductive particle that do not migrate to the inner surface of the container. With the addition of the second additive, the manufacturing PVD process of applying the at least one metal layer, preferably the whole inner coating, can be optimised as higher wattages can be facilitated and the deployment time per unit can be significantly decreased. Preferably carbon nano tubes are used as the second additive.

For similar reasons a further embodiment of the container provides that the plastic composition comprises a second additive having antistatic properties.

Further embodiments of the method and the container according to the invention provide that the base polymer material is polyethylene or polypropylene and/or the at least one metal layer comprises, preferably essentially consists of, titanium (Ti) or titanium compounds, preferably titanium in an oxidised form, most preferred titanium dioxide. The combination of a plastic composition based on a base polymer material like polyethylene or polypropylene in combination with a titanium based inner coating or metal layer respectively has proven to be very beneficial with regard to flexibility and adhesion of the metal layer. If the metal layer is based on titanium dioxide, the inner layer has self-cleaning properties and suppresses bacterial growth, which can be further enhanced by using UV radiation. This effect is thought to be based on the catalytic effect of titanium dioxide.

In a further embodiment of the method according to the invention it is provided that the die is configured as a diverging die and the blow pin is shaped conically to correspond with the diverging die. In other words the die has a conically shaped opening, the diameter of which increases in a material flow direction, wherein the blow bin has a conical shaped section corresponding to the conically shaped opening of the die. This specific arrangement increases the shear forces exercised on the plasticised plastic composition and therefore leads to a higher concentration of globe-like particles near the inner surface of the parison/container.

PREFERRED EMBODIMENTS

Example 1

Step 1: Preparation of Plastic Composition

For the preparation of a first example of a method for producing a coated container, a plastic composition is prepared that consists of 81% by volume of HDPE (Borealis™ BB2581) as base polymer material, 17% by volume 3M™ Ceramic Microspheres W-210 as first additive as well as 2% by volume of Carbon Nano Tubes [Nanocyl™CNT] as second additive having antistatic properties. The microspheres of the first additive have a hardness of 6 according to Mohs scale as well as a true density of 2.4 g/cc and a particle size of 12 microns ($90^{th}$ percentile).

The components of the plastic composition is blended via an extruder device and can be stored in pellet form or directly further processed in an extrusion blow moulding device.

Step 2: Extrusion Blow Moulding

The plastic composition is heated via an extruder device to a melt temperature of 210° C. and processed in the die head at a temperature of 190° C. in order to form a parison by means of a diverging die and a correspondingly shaped blow pin.

After the parison has reached the required length, the mould (mould temperature 20° C.) is closed and a blow pressure of 0.4 MPa (~60 psi) is applied in order to form the uncoated container.

Step 3: Applying the Inner Coating

The inner coating consisting of two metal layers is applied via a PVD process by moving a magnetron device within the inner volume of the container. Before the metal layers are deposited, the inner surface of the uncoated container is pre-cleaned and activated by a plasma cleaning process using oxygen. Afterwards the pressure within the inner volume of the container is lowered to 2e-4 mbar.

Following the cleaning process the first metal layer consisting of titanium is sputtered onto the inner surface using argon as a process gas. The layer thickness of the first metal layer is 300 nm in a neck section and a bottom section of the container and 200 nm on the inner sides of a shell portion of the container. Afterwards the second metal layer consisting of titanium in an oxidised form is applied using a mix of argon gas (80% by volume) and oxygen (20% per volume). The second metal layer has a uniform thickness of 20 nm.

Advantages:

Due to the addition of the second additive the PVD process can be facilitated at a higher wattage as local spontaneous electrical discharges are prevented compared to conventional PVD processes thus resulting in a shorter process time.

Thanks to an increased hardness and inner surface area due to the micro-spherical particles of the first additive, which are located at the inner surface or adjacent to the inner surface of the container, the first metal layer, and thus the whole inner coating, is more mechanically stable (abrasion resistance) and can take higher levels of stress (both tensional and compressive stress) as compared to a conventional container without the first additive.

The container can further be squeezed to 50% of its original undeformed diameter in a radial direction at least 1000 times without the formation of cracks in the inner coating.

Example 2

Step 1: Preparation of Plastic Composition

For the preparation of a first example of a method for producing a coated container, a plastic composition is prepared that consists of 70% by volume of PP (Borealis™ SB815MO) as base polymer material, 30% by volume Silane-coated Potters™ Glassbeads A-Glass 5000 as first additive. The microspheres of the first additive have a hardness of 6 according to Mohs scale as well as a true density of 1.618 g/cc and a particle size of 8 microns ($90^{th}$ percentile).

The components of the plastic composition is blended via an extruder device and can be stored in pellet form or directly further processed in an extrusion blow moulding device.

Step 2: Extrusion Blow Moulding

The plastic composition is heated via an extruder device to a melt temperature of 210° C. and processed in the die head at a temperature of 175° C. in order to form a parison by means of a diverging die and a correspondingly shaped blow pin.

After the parison has reached the required length, the mould (mould temperature 20° C.) is closed and a blow pressure of 0.4 MPa (~60 psi) is applied in order to form the uncoated container.

Step 3: Applying the Inner Coating

The inner coating consisting of two metal layers is applied via a PVD process by moving a magnetron device within the inner volume of the container. Before the metal layers are deposited, the inner surface of the uncoated container is pre-cleaned and activated by a plasma cleaning process using oxygen. Afterwards the pressure within the inner volume of the container is lowered to 2e-4 mbar.

Following the cleaning process the first metal layer consisting of titanium is sputtered onto the inner surface using argon as a process gas. The layer thickness of the first metal layer is 300 nm in a neck section and a bottom section of the container and 200 nm on the inner sides of a shell portion of the container. Afterwards the second metal layer consisting of titanium in an oxidised form is applied using a mix of argon gas (80% by volume) and oxygen (20% per volume). The second metal layer has a uniform thickness of 20 nm.

Advantages:

Thanks to an increased hardness and inner surface area due to the micro-spherical particles of the first additive, which are located at the inner surface or adjacent to the inner surface of the container, the first metal layer, and thus the whole inner coating, is more mechanically stable (abrasion resistance) and can take higher levels of stress (both tensional and compressive stress) as compared to a conventional container without the first additive. The silane coating of the microspheres of the first additive creates a tension between the microspheres and the surrounding resin or plastic composition, that repels the microspheres in the direction of the (inner) surface during the formation of the container.

The container can further be squeezed to 50% of its original undeformed diameter in a radial direction at least 1000 times without the formation of cracks in the inner coating.

Example 3

Step 1: Preparation of Plastic Composition

For the preparation of a first example of a method for producing a coated container, a plastic composition is prepared that consists of 94.5% by volume of LDPE (DOW™ 310E) as base polymer material, 5% by volume Merck™ Titan(IV)-oxid EMPROVE® ESSENTIAL as first additive as well as 0.5% by volume of Einar® 601 polyglycerol ester as second additive having antistatic properties. The microspheres of the first additive have a hardness of 6 according to Mohs scale as well as a true density of 0.85 g/cc and a particle size of 2.5 microns ($90^{th}$ percentile).

The components of the plastic composition is blended via an extruder device and can be stored in pellet form or directly further processed in an extrusion blow moulding device.

Step 2: Extrusion Blow Moulding

The plastic composition is heated via an extruder device to a melt temperature of 200° C. and processed in the die head at a temperature of 170° C. in order to form a parison by means of a diverging die and a correspondingly shaped blow pin.

After the parison has reached the required length, the mould (mould temperature 20° C.) is closed and a blow pressure of 0.4 MPa (~60 psi) is applied in order to form the uncoated container.

Step 3: Applying the Inner Coating

The inner coating consisting of two metal layers is applied via a PVD process by moving a magnetron device within the inner volume of the container. Before the metal layers are deposited, the inner surface of the uncoated container is pre-cleaned and activated by a plasma cleaning process using oxygen. Afterwards the pressure within the inner volume of the container is lowered to 2e-4 mbar.

Following the cleaning process the first metal layer consisting of titanium is sputtered onto the inner surface using argon as a process gas. The layer thickness of the first metal layer is 300 nm in a neck section and a bottom section of the container and 200 nm on the inner sides of a shell portion of the container. Afterwards the second metal layer consisting of titanium in an oxidised form is applied using a mix of argon gas (80% by volume) and oxygen (20% per volume). The second metal layer has a uniform thickness of 20 nm.

Advantages:

Due to the addition of the second additive the PVD process can be facilitated at a higher wattage as local spontaneous electrical discharges are prevented compared to conventional PVD processes thus resulting in a shorter process time.

Thanks to an increased hardness and inner surface area due to the micro-spherical particles of the first additive, which are located at the inner surface or adjacent to the inner surface of the container, the first metal layer, and thus the whole inner coating, is more mechanically stable (abrasion resistance) and can take higher levels of stress (both tensional and compressive stress) as compared to a conventional container without the first additive.

Thanks to the addition of a titanium compound as the first additive a high opacity is achieved that protects the inner volume of the container from sunlight and UV radiation.

The container can further be squeezed to 50% of its original undeformed diameter in a radial direction at least 1000 times without the formation of cracks in the inner coating.

BRIEF DESCRIPTION OF THE DRAWINGS

The invention will now be explained in more detail below with reference to exemplary embodiments. The drawings are provided by way of example and are intended to explain the concept of the invention, but shall in no way restrict it or even render it conclusively, wherein.

WAYS OF CARRYING OUT THE INVENTION

Figure 1:
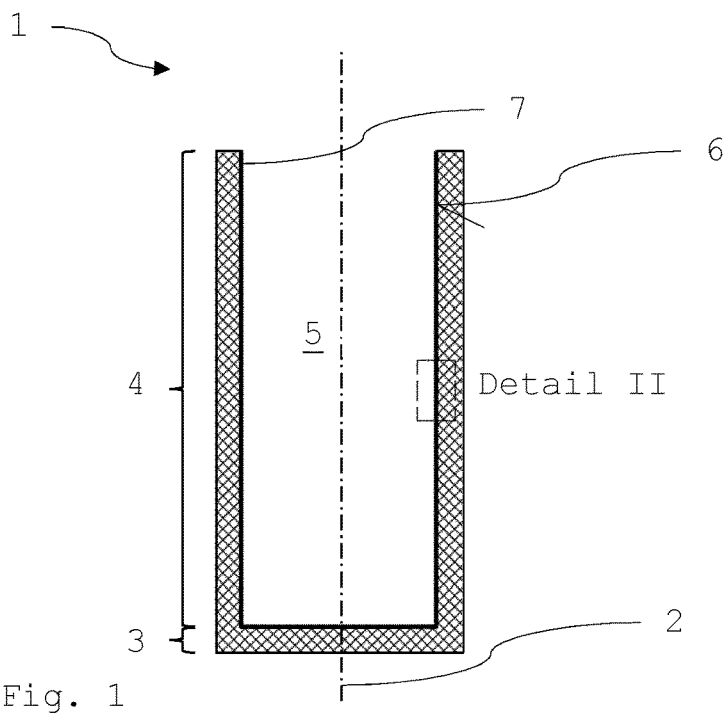
FIG. 1 shows a schematic view of a container.

FIG. 1 shows a schematic view of a cross section coated container 1 made of a plastic composition having a base portion 3 and a shell portion 4 which enclose an inner volume 5 of the container 1 and merge into each other. The container 1 further has a longitudinal axis 2, which is also a rotational axis if the container 1 is rotationally symmetrically formed. The shell portion 4 extends essentially parallel to the longitudinal axis 2 whereas the base portion 3 extends essentially perpendicular to the longitudinal axis 2. An inner surface 6 of the container 1 is defined by the surfaces of shell portion 4 and base portion 3 which limit the inner volume 5.

On the inner surface 6 an inner coating 7 is applied which comprises at least one metal layer.

Figure 2:
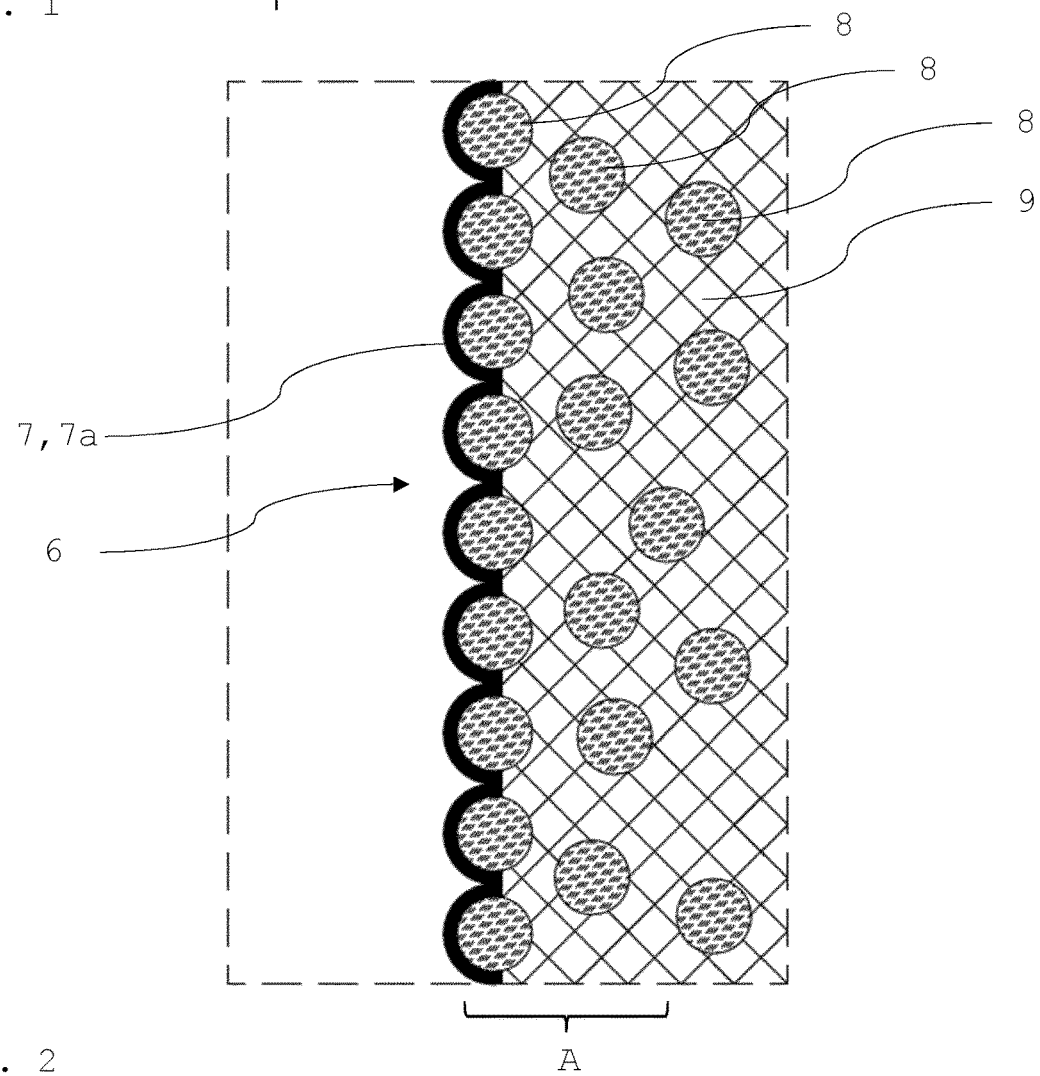
FIG. 2 shows an schematic enlarged view of detail II of the container marked in FIG. 1.

FIG. 2 shows a enlarged view of a section of the container from which the schematic structure of container 1 can be seen. It shall not remain unmentioned that the shown schematic view is used for illustration purposes only and does not represent the real scale.

The plastic composition of which the container 1 is made via an extrusion blow moulding process comprises a base polymer material 9 forming a polymer matrix and a first additive, which comprises globe-like particles 8 having a higher hardness as described in the examples before (only the uppermost three are identified with a reference numeral for the sake of better readability).

Many of the globe-like particles 8 of the first additive are located on the inner surface 6 of the container 1 thereby increasing the surface area of the inner surface 6 as well as its mechanical stability. When the inner coating 7, in the present case the inner coating consists of a metal layer 7a, is deposited onto the inner surface 6 being partially formed by the base polymer material 9 and partially by the globe-like particles 8 protruding from the base polymer material 9, the applied layer adheres particularly well to the globe-like particles 8 which results in higher levels of endurable stress (both tensional and compressive stress) of the inner coating 7 as compared to an inner coating applied to conventional container without the first additive consisting only of the base polymer material.

It can be further seen that the concentration of the globe-like particles 8 is higher in an area A adjacent to the inner surface 6 than compared to an average concentration throughout the whole cross section. It can be seen that the amount of globe-like particles 8 decreases from the area A adjacent to the inner surface 7 in direction of an outer surface of the container 1.

Figure 3:
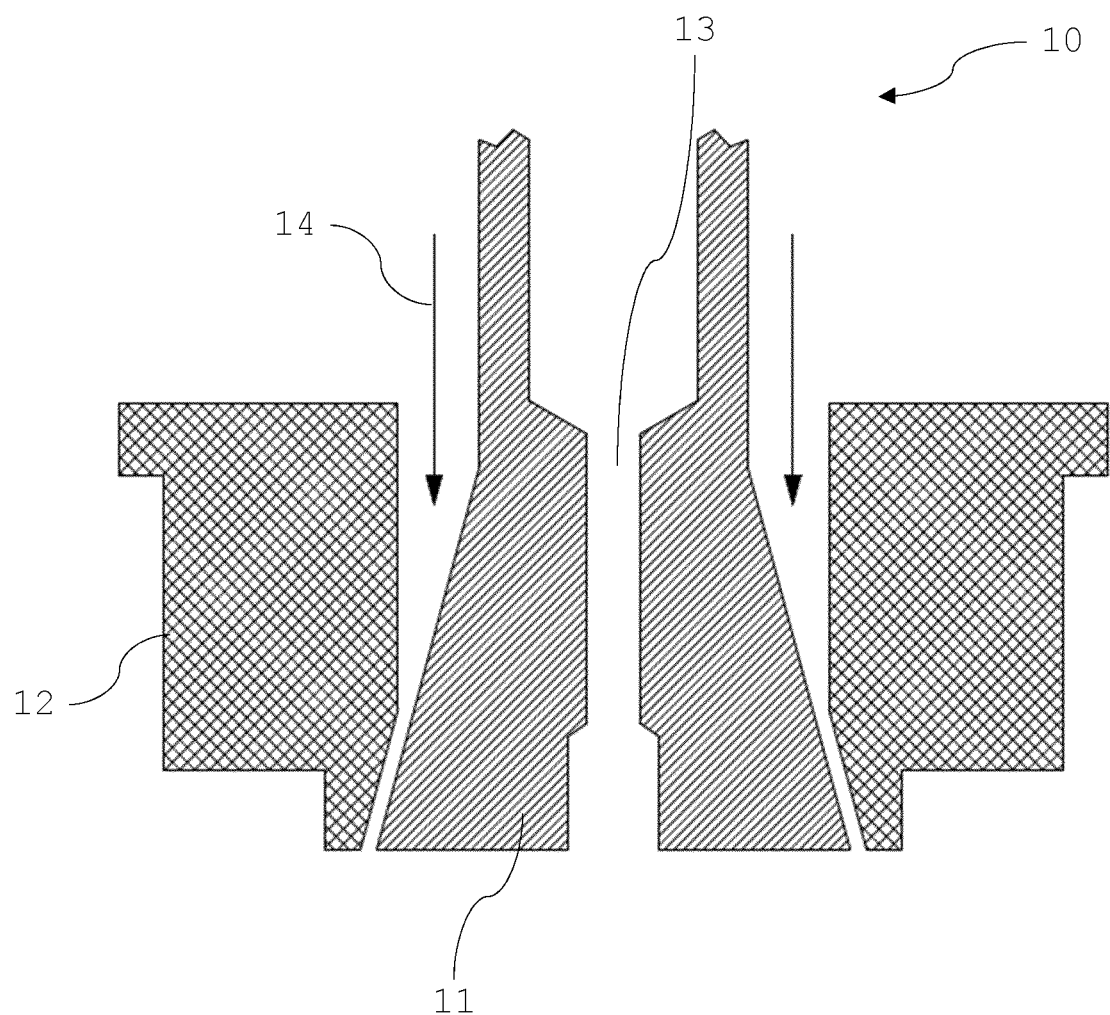
FIG. 3 shows a schematic view of a die head of an extrusion blow moulding device.

FIG. 3 schematically shows a die head 10 of an extrusion blow moulding device having a blow pin 11 and a die 12. With the help of such a device an uncoated container 1 can be manufactured.

The blow pin 11 has a central air inlet line 13 for blowing air into a parison formed by blow pin 11 and die 12. The molten plastic composition, which is blended and heated by an extruder (not shown), flows in a material flow direction 14 through the die head 10.

The die 12 is configured as a diverging die, meaning that the diameter of the die is opening seen in the material flow direction 14. The outer surface of the blow pin 11 is also shaped conically corresponding to the die 12 in order to define a gap, which forms the parison. Due to the shape of blow pin 11 and die 12, the shear forces exercised to the molten and plasticised plastic composition result in the globe-like particles 8 being directed inwards in direction of the inner surface 6 of the container 1. This effect leads to the higher concentration of globe-like particles 8 in the area A adjacent to the inner surface 6 described before.

It shall not remain unmentioned, that the shape and size of the container 1 can be chosen individually and the shown container 1 is only presented as one example of many.

REFERENCE NUMERALS 1 container
2 longitudinal axis
3 base portion
4 shell portion
5 inner volume
6 inner surface
7 inner coating
   7a first metal layer
8 globe-like particles
9 base polymer material
10 die head
11 blow pin
12 die
13 air inlet line
14 material flow direction
   A area adjacent to the inner surface 6

The invention claimed is:

1. A method for producing a container made of a plastic composition having an inner coating on an inner surface of the container, the inner coating having a maximum thickness of 1000 nm and comprising at least one metal layer,
the method comprising:
preparing the plastic composition comprising at least one base polymer material and at least a first additive,
wherein at least 2.5% by volume of a total volume of the plastic composition is made up by the first additive and wherein the first additive comprises globe-like shaped particles having a hardness on the Mohs scale of at least 4;
extrusion blow molding of the container by
a) heating and blending the prepared plastic composition until at least the base polymer material is plasticized;
b) forming a parison by a die and a blow pin, wherein the globe-like shaped particles of the first additive are accumulated on an inner surface of the parison resulting from shear forces exercised by die and blow pin;
c) blow molding of the parison to form the container, wherein globe-like shaped particles of the first additive which located on the inner surface of the container increase the surface area and the hardness of the inner surface of the container;
applying the at least one metal layer of the inner coating onto the inner surface of the container, wherein the applied metal layer bonds to the globe-like shaped particles of the first additive located on the inner surface of the container.

2. The method according to claim 1, wherein the globe-like shaped particles of the first additive comprise silicon in an oxidized form and/or titanium in an oxidized form, wherein at least 50% by volume of the first additive is made up by the globe-like shaped particles.

3. The method according to claim 1, wherein the globe-like shaped particles of the first additive are selected from a group consisting of cenospheres, aluminosilicate microspheres, intermetallic microspheres, phenolic microspheres, metal microspheres, glass microspheres, ceramic microspheres, composite microspheres, crystalline microspheres, plastic microspheres or combinations thereof.

4. The method according to claim 1, wherein the globe-like shaped particles of the first additive have a diameter of between 0.5 μm and 50 μm.

5. The method according to claim 1, wherein the at least one metal layer is applied onto the inner surface of the container by physical vapor deposition [PVD].

6. The method according to claim 1, wherein the plastic composition comprises a second additive having antistatic properties, wherein at least 0.5% by volume of the total volume of the plastic composition is made up by the second additive.

7. The method according to claim 1, wherein the base polymer material is polyethylene or polypropylene and/or the at least one metal layer comprises titanium or titanium compounds.

8. The method according to claim 1, wherein the die is configured as a diverging die and the blow pin is shaped conically to correspond with the diverging die.

9. The method according to claim 5, wherein the whole inner coating is applied onto the inner surface of the container by PVD.

10. The method according to claim 1, wherein the globe-like shaped particles comprise at least one of sphere-shaped, ellipsoid-shaped and convexly curved shaped contoured particles.

11. A container made of a plastic composition,
wherein the plastic composition comprises a base polymer material and a first additive,
wherein an inner coating comprising at least one metal layer is applied to an inner surface of the container, the inner coating having a maximum thickness of 1000 nm,
wherein the first additive comprises globe-like shaped particles having a hardness on the Mohs scale of at least 4,
wherein globe-like shaped particles of the first additive which are located on the inner surface of the container increase the surface area and the hardness of the inner surface,
wherein the inner coating has an increased adhesion to the inner surface of the container due to an applied metal layer binding to the globe-like shaped particles of the first additive located on the inner surface of the container.

12. The container according to claim 11, wherein the globe-like shaped particles of the first additive are distributed in a polymer matrix of the container with respect to a cross-section area of the container in such way, that a ratio of globe-like shaped particles per $mm^2$ is higher in an area adjacent to the inner surface of the container that an average ratio of globe-like shaped particles per $mm^2$ of the total cross-section area.

13. The container according to claim 11, wherein the globe-like shaped particles of the first additive comprise silicon in an oxidized form and/or titanium in an oxidized form.

14. The container according to claim 11, wherein the globe-like shaped particles of the first additive are selected from a group consisting of cenospheres, aluminosilicate microspheres, intermetallic microspheres, phenolic microspheres, metal microspheres, glass microspheres, ceramic microspheres, composite microspheres, crystalline microspheres, plastic microspheres or combinations thereof.

15. The container according to claim 11, wherein the globe-like shaped particles of the first additive have a diameter of between 0.5 μm and 50 μm.

16. The container according to claim 11, wherein the plastic composition comprises a second additive having antistatic properties.

17. The container according to claim 11, wherein the base polymer material is polyethylene or polypropylene and/or the at least one metal layer comprises titanium or titanium compounds.

18. The container according to claim 11, wherein the container is obtainable by a method comprising:
preparing the plastic composition comprising at least one base polymer material and at least a first additive, wherein at least 2.5% by volume of a total volume of the plastic composition is made up by the first additive and wherein the first additive comprises globe-like shaped particles having a hardness on the Mohs scale of at least 4;
extrusion blow molding of the container by
a) heating and blending the prepared plastic composition until at least the base polymer material is plasticized;

b) forming a parison by a die and a blow pin, wherein the globe-like shaped particles of the first additive are accumulated on an inner surface of the parison resulting from shear forces exercised by die and blow pin;

c) blow molding of the parison to form the container, wherein globe-like shaped particles of the first additive which located on the inner surface of the container increase the surface area and the hardness of the inner surface of the container;

applying the at least one metal layer of the inner coating onto the inner surface of the container, wherein the applied metal layer bonds to the globe-like shaped particles of the first additive located on the inner surface of the container.

19. The method according to claim 7, wherein the at least one metal layer consists essentially of titanium or titanium compounds.

20. The container according to claim 11, wherein the at least one metal layer has an increased adhesion to the inner surface of the container due to the applied at least one metal layer binding to the globe-like shaped particles of the first additive located on the inner surface of the container.

21. The container according to claim 13, wherein the globe-like shaped particles of the first additive substantially consist of a crystalline structure of which titanium dioxide or silicon dioxide or silicate is a main component.

22. The container according to claim 17, wherein the at least one metal layer consists essentially of titanium or titanium compounds.

23. The container according to claim 11, wherein the globe-like shaped particles comprise at least one of sphere-shaped, ellipsoid-shaped and convexly curved shaped contoured particles.

* * * * *